(12) United States Patent
Zhmudyak et al.

(10) Patent No.: US 11,525,467 B2
(45) Date of Patent: Dec. 13, 2022

(54) METHOD OF GAS EXCHANGE FOR FOUR-STROKE ENGINE

(71) Applicants: Alexandra Leonidovna Zhmudyak, Rehovot (IL); Leonid Moiseevich Zhmudyak, Rehovot (IL)

(72) Inventors: Alexandra Leonidovna Zhmudyak, Rehovot (IL); Leonid Moiseevich Zhmudyak, Rehovot (IL)

( * ) Notice: Subject to any disclaimer, the term of this patent is extended or adjusted under 35 U.S.C. 154(b) by 66 days.

(21) Appl. No.: 16/984,170

(22) Filed: Aug. 4, 2020

(65) Prior Publication Data
US 2021/0048045 A1 Feb. 18, 2021

Related U.S. Application Data

(60) Provisional application No. 62/888,447, filed on Aug. 17, 2019.

(51) Int. Cl.
*F15B 15/14* (2006.01)
*F02B 75/02* (2006.01)

(52) U.S. Cl.
CPC .... *F15B 15/1428* (2013.01); *F02B 2075/027* (2013.01)

(58) Field of Classification Search
CPC ............ F15B 15/1428; F02B 2075/027; F02B 25/04; F01B 17/02
See application file for complete search history.

(56) References Cited

U.S. PATENT DOCUMENTS

| | | | | |
|---|---|---|---|---|
| 4,177,772 A * | 12/1979 | Franke | ............... | F02B 17/00 123/25 C |
| 4,248,199 A * | 2/1981 | McWhorter | ..... | F02M 35/10118 123/315 |
| 4,312,313 A * | 1/1982 | McWhorter | ............ | F02B 25/04 123/433 |
| 4,986,224 A * | 1/1991 | Zuffi | ....................... | F02B 25/04 123/41.56 |
| 5,005,539 A * | 4/1991 | Kawamura | ............. | F02B 37/10 123/21 |
| 5,154,141 A * | 10/1992 | McWhorter | ............ | F02B 69/06 123/21 |
| 5,934,262 A * | 8/1999 | Konig | ................. | F02B 23/0621 123/193.6 |
| 9,181,851 B1 * | 11/2015 | Bandyopadhyay | ......................... | F02M 21/0215 |
| 9,194,344 B1 * | 11/2015 | Foege | ................. | F02D 19/0692 |
| 2010/0326411 A1 * | 12/2010 | Perovic | ................... | F02B 39/10 123/65 R |

(Continued)

*Primary Examiner* — Hung Q Nguyen

(57) ABSTRACT

This method of gas exchange for four-stroke piston internal combustion engine comprising gas exchange through an intake and an exhaust valves and includes gas exchange through a piston-controlled port in a cylinder sleeve: exhausting combustion products through the port at the end of the power stroke and at the beginning of the exhaust stroke, removal of exhaust gases from the port (from the space outside the port, outside the cylinder) and air supply to the port (supply into afore-mentioned space). As a result, the combustion products do not return to the cylinder through the port at the end of the intake stroke and at the beginning of the compression stroke. This effect is combined with air intaking into the cylinder through the port at the end of the intake stroke and at the beginning of the compression stroke.

10 Claims, 7 Drawing Sheets

The port 2 and the channel 9.

(56) References Cited

U.S. PATENT DOCUMENTS

| | | | |
|---|---|---|---|
| 2011/0048366 A1* | 3/2011 | Tsuchida | F02B 25/06 123/193.6 |
| 2012/0318226 A1* | 12/2012 | Stone | F02D 19/0647 123/1 A |
| 2014/0150740 A1* | 6/2014 | Zhmudyak | F02B 25/04 123/90.1 |
| 2014/0238350 A1* | 8/2014 | Fiveland | F02M 21/0269 123/445 |

* cited by examiner

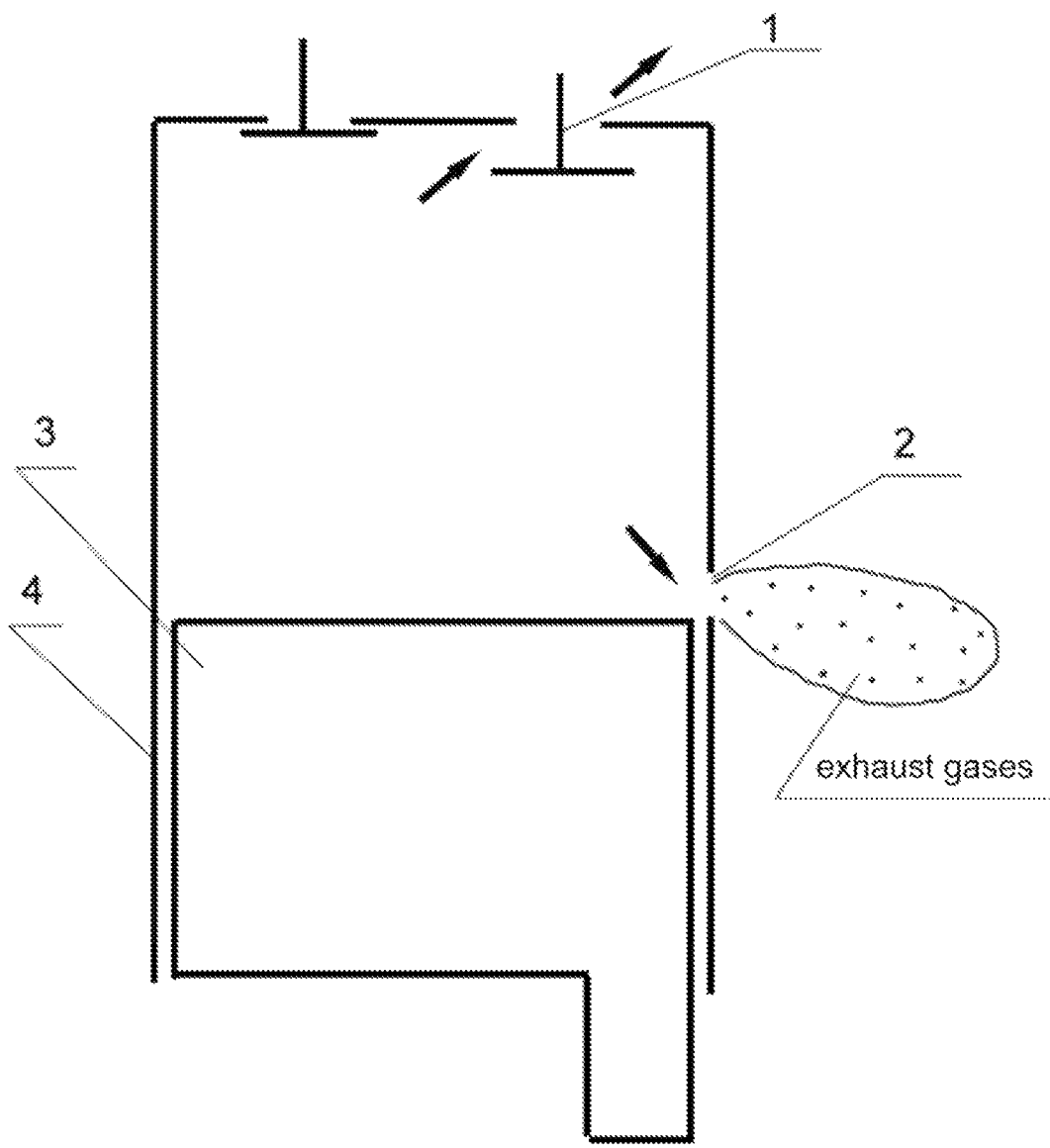
Fig. 1a. The end of the power stroke.

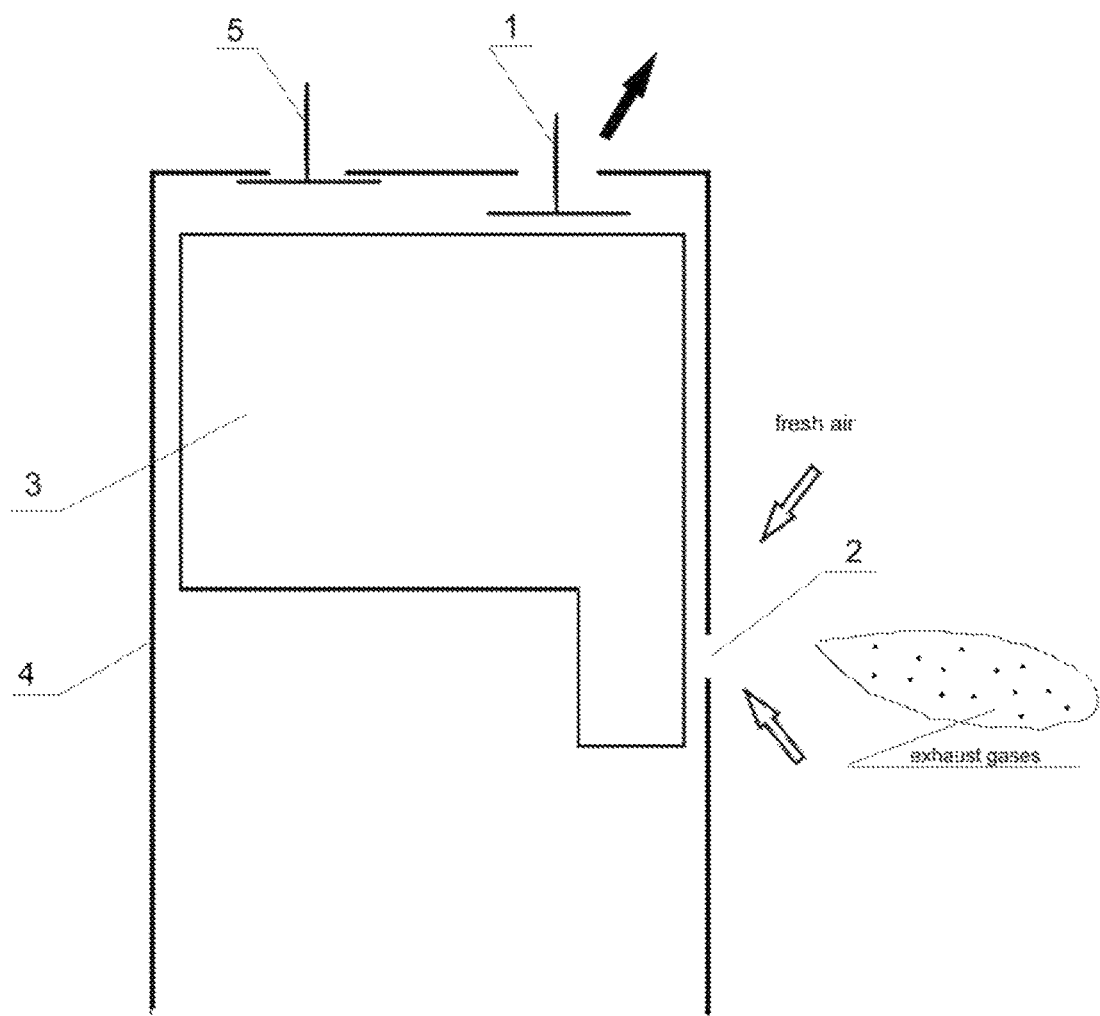
Fig. 1b. The end of the exhaust stroke.

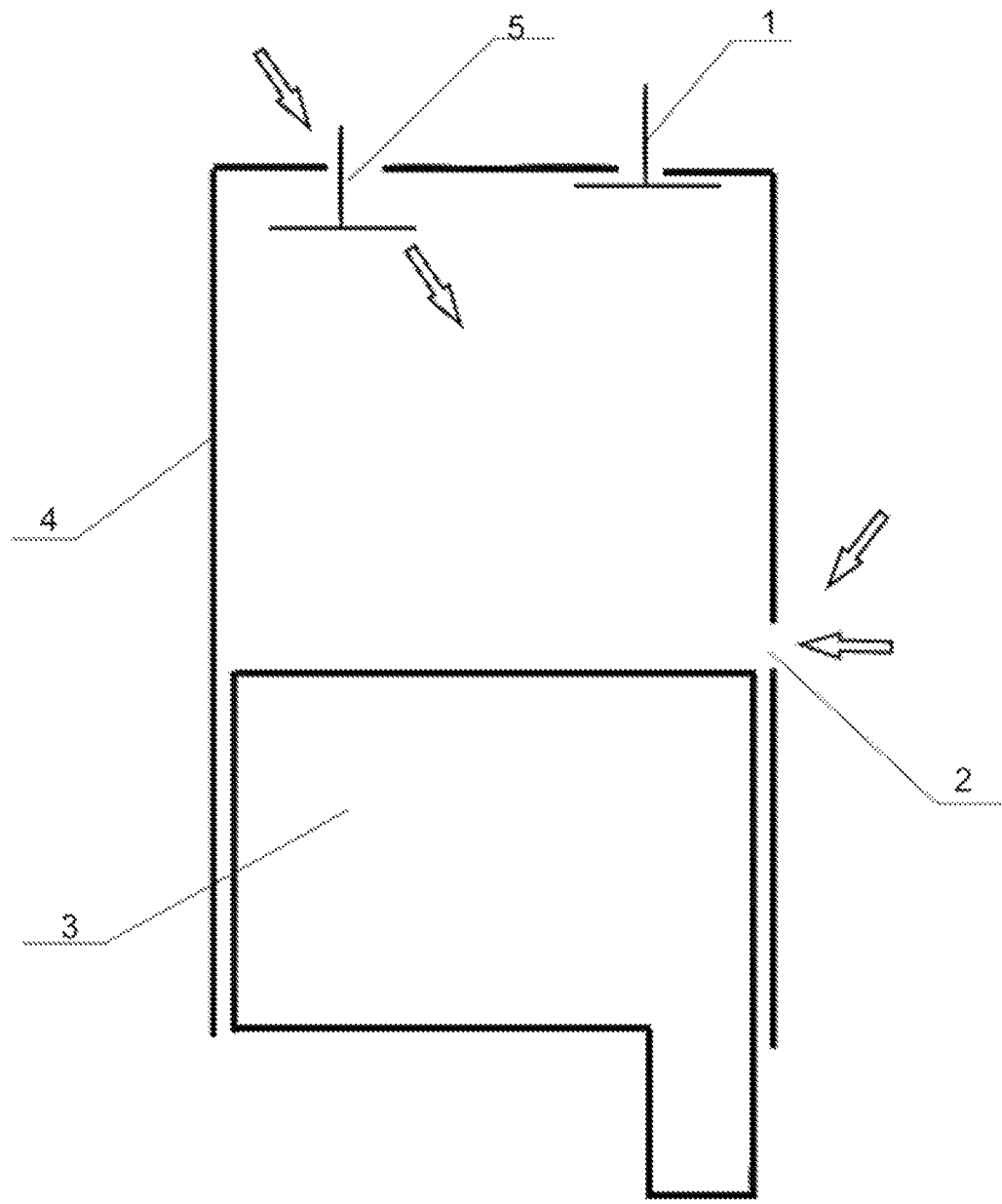
Fig. 1c. The intake stroke.

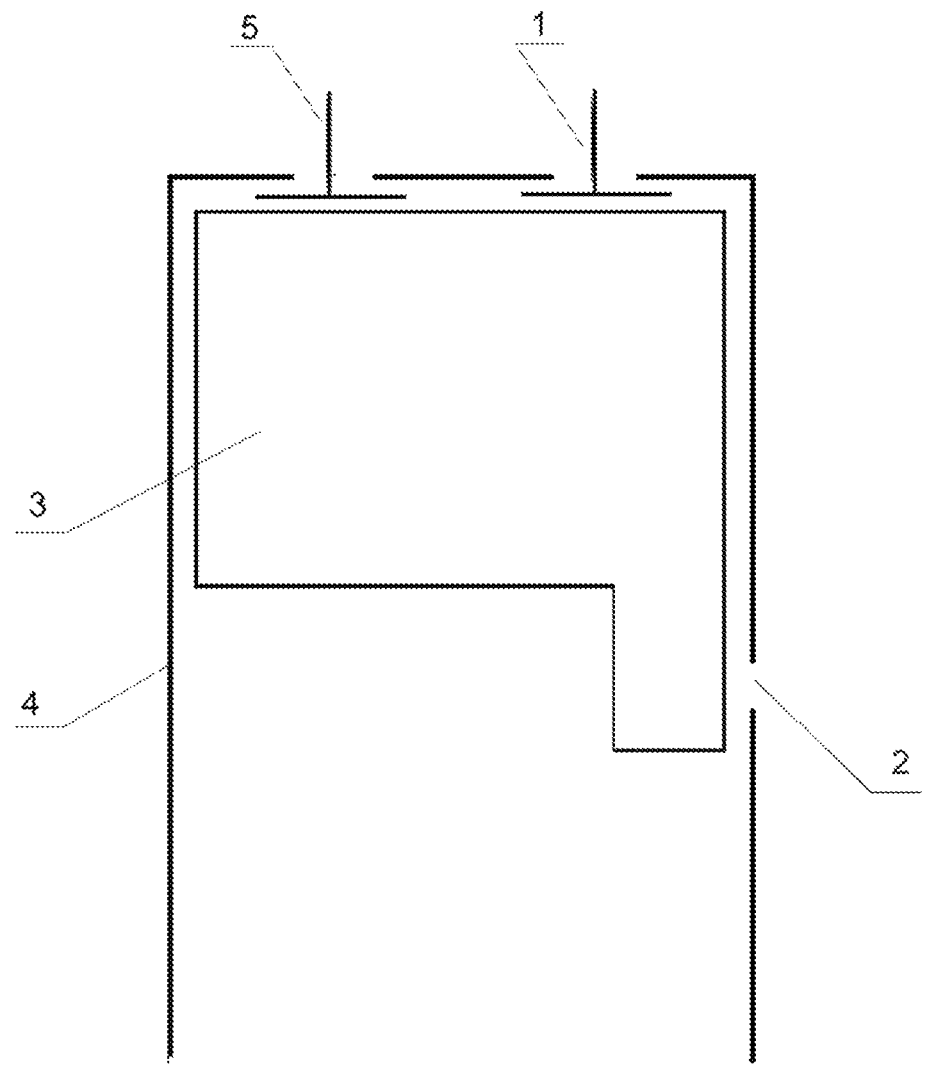
Fig. 1d. The end of the compression stroke.

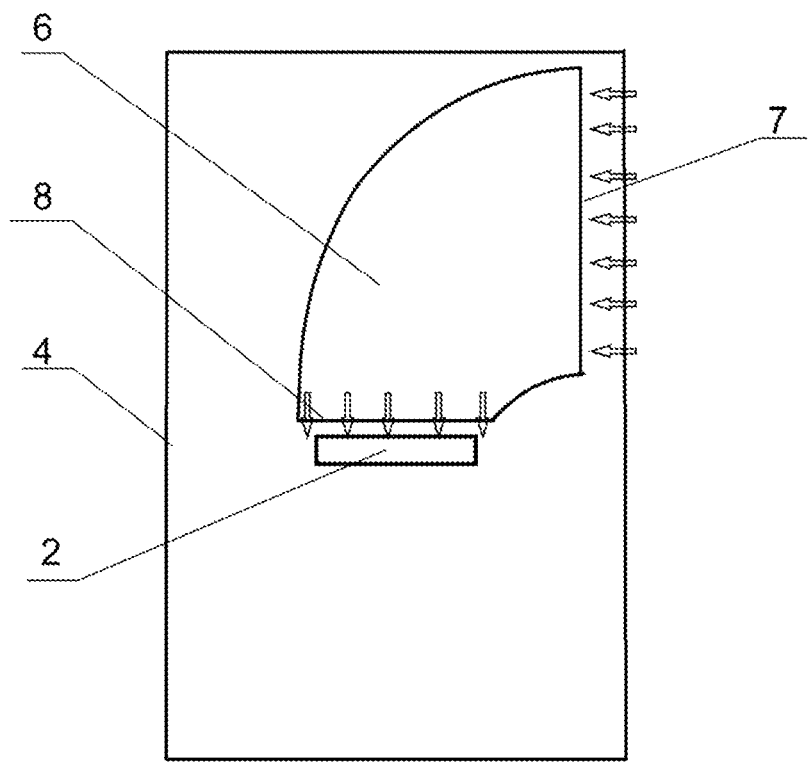
Fig. 2a. The convergent channel and the cylinder.
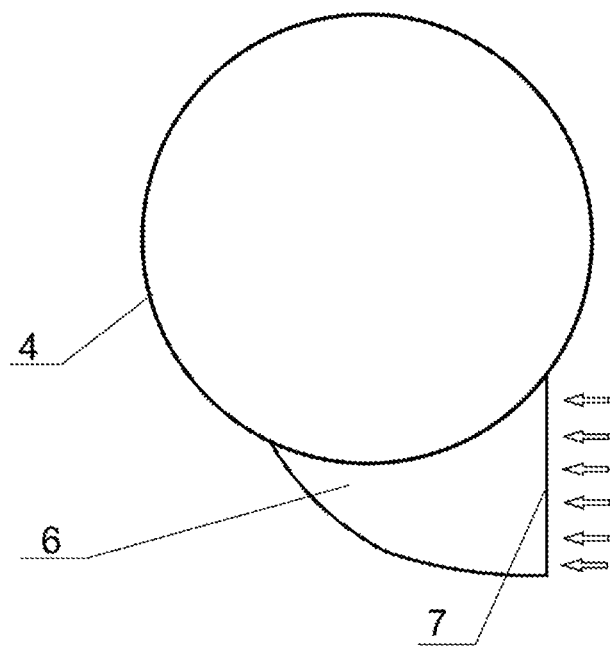
Fig. 2b. Plane view of the cylinder and the convergent channel.

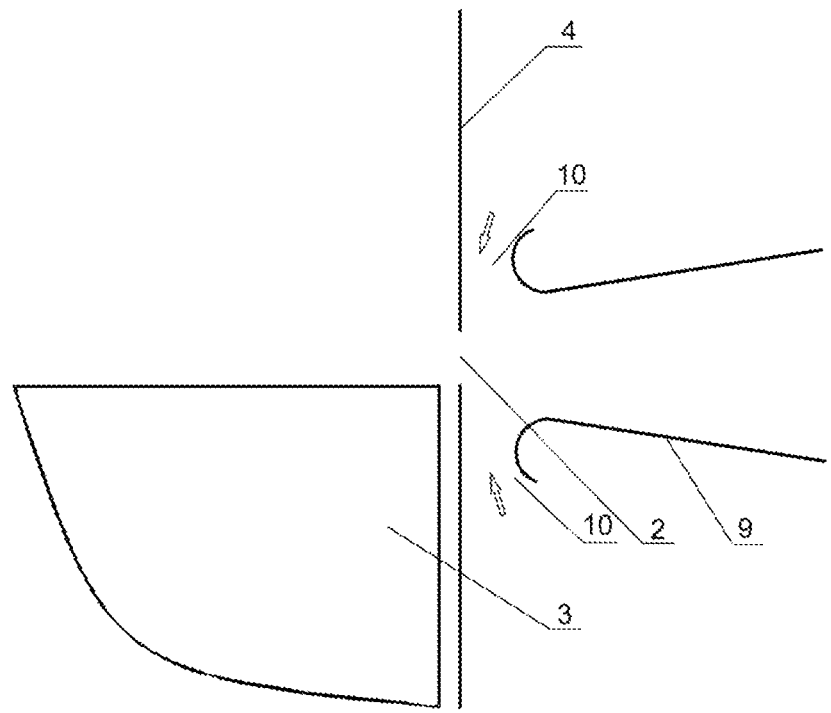
Fig. 3a. The port 2 and the channel 9.
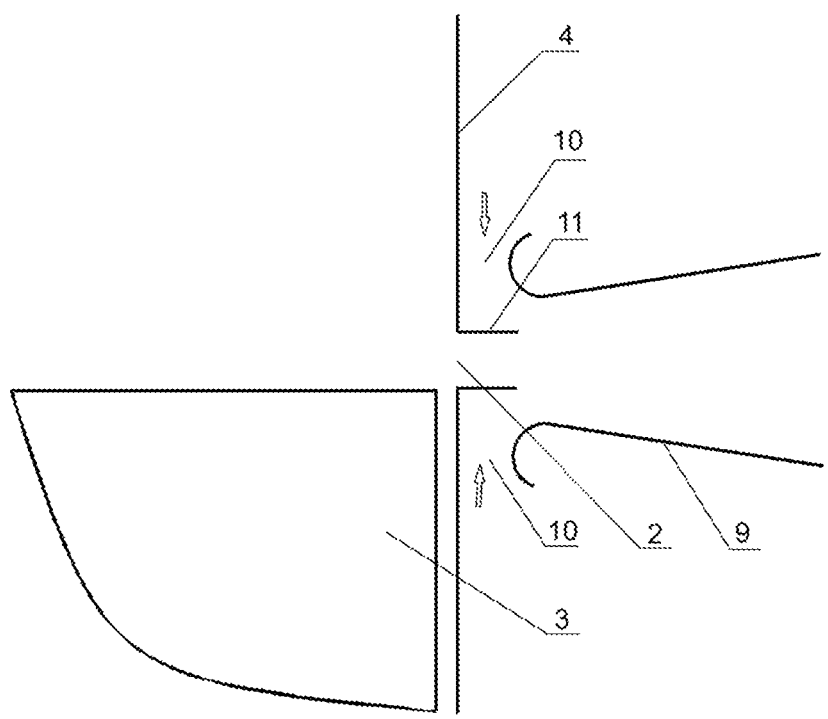
Fig. 3b. The port 2, the channel 9 and the nozzle 11.

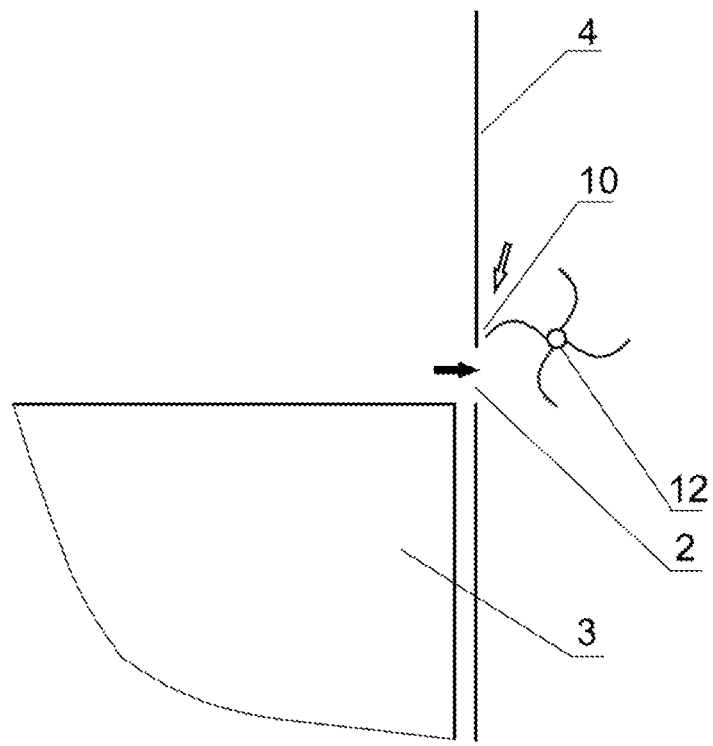
Fig. 4a. The cylinder 4 and the turbomachine 12.
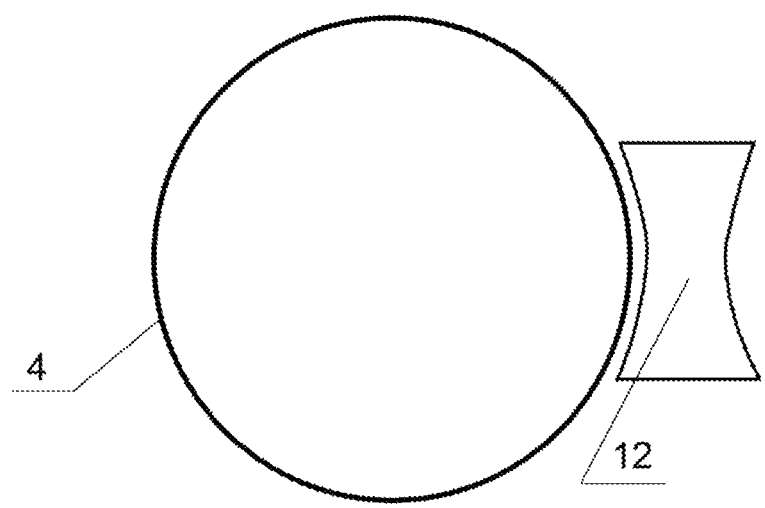
Fig. 4b Top view of the cylinder and the turbomachine 12.

METHOD OF GAS EXCHANGE FOR FOUR-STROKE ENGINE

FIELD OF THE INVENTION

The invention relates to methods of gas exchange for four-stroke piston internal combustion engine comprising gas exchange through an intake and an exhaust valves and gas exchange through a piston-controlled port in a cylinder sleeve, first of all, to such engines in which the gas pressure in the cylinder (inside the cylinder) at the end of the intake is lower than atmospheric pressure. This means that the method can also be used in naturally aspirated engines.

A cycle of said four-stroke piston internal combustion engines includes: intaking a fresh charge (air or air-fuel mixture) through the intake valve, compressing the fresh charge in the cylinder, combustion, expansion processes on the power stroke, exhausting combustion products through the exhaust valve. Versions of the method are implemented in engines having the port in the cylinder sleeve, that (port) is opened when the piston is near BDC. A cycle of these versions of the method includes exhausting combustion products through the port in the cylinder sleeve.

The invention can be used in spark ignition engines and compression ignition engines (diesels), in engines with direct fuel injection into a cylinder or an intake manifold, as well as in engines with fuel carburetion, in naturally aspirated engines as well as in engines with supercharger (mechanical compressor powered off of the crankshaft). Some versions of the method can be used in turbocharged engines.

Some of the versions of the method are intended for engines (for example, aircraft engines, aircraft models and the like), for which it is permissible the exhaust into the atmosphere directly, without exhaust devices: exhaust manifold, exhaust pipe, muffler (silencer), etc., or with a very short exhaust pipe.

BACKGROUND OF THE INVENTION

Known method of gas exchange that uses the port in the sleeve (the port with a sleeve valve) for exhausting combustion products through the port at the end of power stroke and at the beginning of exhaust stroke [Ricardo, Sir Harry R.; Hempson, J. G. G. (1968). The High-Speed Internal-Combustion Engine (Fifth ed.). London and Glasgow: Blackie & Son. pp. 290-322.].

In the engines using this method, at the end of the intake stroke and the beginning of the compression stroke there are combustion products outside the port in the sleeve (in the space outside the port, outside the cylinder). When the port in the sleeve is used for gas exchange, it is possible (at least for naturally aspirated engine) a "backflow", i.e. a portion of the combustion products may return through the port into the cylinder at the end of the intake stroke and at the beginning of the compression stroke. To prevent backflow, the sleeve valve which closes the port at the end of the intake stroke and at the beginning of the compression stroke is mounted. This sleeve valve complicates the design of the engine, so the method of gas exchange through the port in the sleeve with said sleeve valve is not competitive compared to the conventional gas exchange method.

BRIEF SUMMARY

The offered method is implementing only in the four-stroke engines. It is proposed to make the port in the sleeve of this engine. This piston-controlled port 2 (FIG. 1a) is uncovering at the end of the power stroke (FIG. 1a) and at the end of the intake stroke (FIG. 1c).

At the end of the power stroke (FIG. 1a) the exhaust gas flows from the cylinder 4 through both exhaust valve 1 and port 2 (black arrows). (Exhaust gas flows through the port 2 to the atmosphere.)

The idea of the simplest version of the proposed method is the following: do not interfere with the exhaust gases flowed out through the port to fly away from the cylinder (FIG. 1a, FIG. 1b). In this case the exhaust gases fly away from the port 2 by inertia (FIG. 1b) and fresh air (white arrows FIG. 1b) replaces them near the port.

At the end of the intake stroke (FIG. 1c) the port 2 is uncovering again. At this moment there is fresh air outside the port, the pressure inside the cylinder is lower than the pressure outside the cylinder. Therefore, air intakes into the cylinder through the port. That is, air enters the cylinder both through the intake valve 5 and through the port 2 (see white arrows in FIG. 1c).

The exhaust gases do not return to the cylinder through the port, despite the fact, that the port at the end of the intake stroke is open (FIG. 1c) and the pressure inside the cylinder 4 is lower than the pressure outside the cylinder. This leads to positive results include easy exhaust via both: exhaust valve 1 and port 2 (FIG. 1a), a decrease in thermal load, an increase in filling of the cylinder with the fresh charge, as well as positive effects that follow from the above: a decrease in the tendency to detonation (for engines with spark ignition), therefore, the possibility of increasing the compression ratio; increase in engine speed, therefore, increase in power; reduction of the cooling system; increase in efficiency, etc.

BRIEF DESCRIPTION OF THE DRAWINGS

FIGS. 1a, 1b, 1c, 1d—illustrate the simplest version of the proposed method of gas exchange of four-stroke internal combustion engine.

FIG. 1a shows the end of the power stroke when the piston is at BDC. The black arrows show the exhaust (outflow of gases from the cylinder) through both: the port 2 and the exhaust valve 1. The exhaust gases that have flowed out of the cylinder (a jet of gases) through the port 2 are shown with black dots (black circles).

FIG. 1b shows the end of the exhaust stroke when the piston is near TDC, exhaust gases flow out (black arrow) through the exhaust valve 1. Exhaust gases, that previously had flowed out of the port 2 in the cylinder sleeve, fly away of the cylinder (black dots, black circles). Air is sucked into the space near the port (outside the cylinder). Said air (white arrows) is sucked when the jet of exhaust gases flows away of the cylinder by inertia.

FIG. 1c shows the intake when the piston is at bottom dead center (BDC) of the intake stroke of the engine. The white arrows show the air entering in the cylinder through both: the intake valve and the port in the sleeve.

FIG. 1d shows the end of the compression stroke when the piston is near top dead center (TDC).

FIG. 2a shows the air channel (contracted channel, deflector-confusor, convergent channel) for intensifying the removal of combustion products from the port in the sleeve. There is a view from the side of the port in the sleeve (view of the side of the cylinder where the port is located) in FIG. 2a. The air channel (contracted channel) has a bend, which turns the flow of incoming air so that the air flowing out the channel blows off the exhaust gases flowing out the port in the sleeve.

FIG. 2b. This figure shows the plane view from the side of the cylinder head per cylinder and the air channel shown in FIG. 2a.

FIG. 3a shows the port in the sleeve—2 and the device (the channel 9) for intensifying the removal of combustion products from the port in the sleeve and the intensification of the supply of fresh ambient air to the port in the sleeve (to the space outside the port, outside the cylinder, close to this port).

FIG. 3b shows device shown in FIG. 3a, and in addition provided with a short nozzle 11. This nozzle directs the exhaust gases into the channel 9.

FIG. 4a. Intensification of both the removal of exhaust gases from the port in the sleeve and the supply the surrounding air to the port (into the space close to the port) using turbomachine 12.

FIG. 4b. Top view of the cylinder and the turbomachine mounted at the port in the sleeve.

DETAILED DESCRIPTION OF THE INVENTION

The proposed method was developed, first of all (but not only), for four-stroke engines in which the gas pressure in the cylinder (inside the cylinder) at the end of the intake is lower than atmospheric pressure. This means that the method can also be used in conventional naturally aspirated engines. According to the method, the constantly open port in the cylinder sleeve is used for exhausting combustion products. This (piston-controlled) port is opened by the piston at the end of power stroke and beginning of the exhaust stroke. The port is also open at the end of the intake process and at the beginning of the compression process. But due to the use of the proposed method at the end of the intake process and at the beginning of compression process the combustion products practically do not return into the cylinder, despite the fact that the pressure in the cylinder is below atmosphere pressure and the port in the cylinder sleeve is open. Prevention of the return of exhaust gases into the cylinder at the end of the intake stroke is achieved as follows: during the time between the opening of the port in the sleeve at the end of the power (expansion) stroke and the opening of this port at the end of the intake stroke, the combustion products are removed from the port and surrounding (atmospheric, ambient) air is supply or sucked to the port into the place of these combustion products. Therefore, if gas enters into the cylinder through the port at the end of the intake process, it is the air that enters and not combustion products.

In the present description the term "port in a/the cylinder sleeve" is used; obviously, the proposed method can be used in engines in which the cylinder is made in the cylinder block and does not have a sleeve, and the port (or ports) is made (cut) in the cylinder wall.

The simplest version of the offered method is implemented in the four-stroke internal combustion engine comprising—see FIG. 1—piston-controlled port in the cylinder sleeve: port is uncovering as piston moves down to the bottom of piston stroke and covering as piston moves up from the bottom of piston stroke, valves on the port are not mounted, combustion chamber (a space inside a cylinder) connects directly to the atmosphere via the port in the cylinder sleeve. "Connects directly" means connects without exhaust manifold, exhaust pipe, muffler (silencer) and catalytic converter.

According to offered method at the last stage of the power stroke (and at the last stage of expansion process) the exhaust valve 1 (FIG. 1a) is opened like at the well-known classic method of gas exchange of four-stroke engines (said classic method of gas exchange is a prototype of the present invention), the exhaust gases flow out through the exhaust valve 1—see black arrows at the top of FIG. 1a. At the considered moment (FIG. 1a) port 2 in the sleeve is opened as piston 3 is at BDC (BDC of the power stroke) and exhaust gases flow out of the cylinder 4 through the port 2. The flowing out of exhaust gases through the port is shown in FIG. 1a with a black arrow, exhaust gases that have already flowed out of the cylinder into the atmosphere are indicated by black dots.

Use of the port increases the flow area of the exhaust gases outflow and allows: to reduce the power waste when pushing out the exhaust gases, what increases efficiency; to exercise exhaust at high frequencies of rotation of the crankshaft, i.e. to increase the engine speed and proportionally to increase the engine power. The exhaust via both: exhaust valve 1 and port 2, i.e. split the outflow of hot exhaust gases, reduces temperature and the heat load of the cylinder head and the exhaust valve.

The exhaust gases flow out through both valve 1 and port 2 continues in the beginning of the exhaust stroke (when the piston moves from BDC) until the piston covers the port 2.

(In other words, the present method includes exhausting combustion products through the port in the cylinder sleeve at the end of the power stroke and at the beginning of the exhaust stroke.)

Then, in the exhaust process, the piston is moving towards top dead center (TDC) and continues to push exhaust gases through the exhaust valve 1, see FIG. 1b, black arrow.

At the exhaust stroke, when the piston 3, moving to the TDC, closes the port 2, the outflow of exhaust gases through the port is ended. The exhaust gases, which had previously flowed out of the cylinder through the port, fly away from the port by inertia, and fresh air (surrounding air) is sucked from the environment to the port. Air flow to the port 2 is indicated by white arrows in FIG. 1b. The jet of exhaust gases, which has flown away from the cylinder, is depicted by black dots in FIG. 1b. In this way, the following actions are executed: the removal of exhaust gases from the port in the sleeve (from the space outside the port, outside the cylinder) into the atmosphere and also suction of air or air supply to the port (suction or supply of air into the aforementioned space) in the period between opening the port at the end of the power stroke and closing the port at the beginning of the compression stroke (or at least during the period between closing the port at the exhaust stroke and closing the port at the beginning of the compression stroke).

At the next stroke—intake stroke—the piston travels from TDC to BDC with the intake valve 5 open and exhaust valve 1 closed—see FIG. 1c, air passes (air flow indicated by white arrows) through the intake valve 5 into the cylinder 4. There is intaking the fresh charge (air or air-fuel mixture) through the intake valve.

At the end of the intake stroke (and at the end of the process of admission) piston 3 appears again in the BDC—FIG. 1c. When the piston approach to the BDC, port 2 is reopening, thus a space inside the cylinder connected to the space outside the port, outside the cylinder. (I.e. combustion chamber, the space inside a cylinder, connects directly to the atmosphere via the port in the cylinder sleeve.) At this moment there is fresh air outside the port (near the port). The pressure inside the cylinder at the end of the intake stroke (or at the end of the intake stroke and at the beginning of the compression stroke) is lower than the pressure in the space outside the port, outside the cylinder. Therefore, air flows (air intaking) into the cylinder through port 2 in the cylinder sleeve at the end of the intake stroke or at the end of the intake stroke and at the beginning of the compression stroke. Air flow into the cylinder through port 2 indicated in FIG. 1c by white arrows.

An additional intake through the port in the sleeve increases the filling of the cylinder with the fresh charge. This increase in filling can be executed (can be realized) not at all versions of the engine, not for all engine models and not the entire period when the port is opened. More important is another: in the proposed engine, in despite of the constantly open port, there is no significant return of exhaust gases to the cylinder at the end of the intake stroke and at the beginning of the compression stroke. By the significant return of exhaust gases to the cylinder is meant one whose negative effect is equal to or greater than the positive effect of the port in the sleeve. The positive effects include easy exhaust, a decrease in thermal load (thermal stress), in some cases, an increase in filling, etc., as well as positive effects that follow from the above: a decrease in the tendency to detonation (for engines with spark ignition), therefore, the possibility of increasing the degree of compression; increase in engine speed, therefore, increase in power; reduction of the cooling system; increase in efficiency, etc.

After the afore-mentioned end of the intake and beginning of compression on the compression stroke, the piston continues travels from BDC to TDC with the intake valve and exhaust valve closed—FIG. 1d. There is compression of the fresh charge (air or air-fuel mixture) continues in the cylinder. In the case of air compression fuel is injected into it.

Then self-ignition and/or ignition from a spark (by external ignition source) is executed. At the power stroke (expansion stroke) combustion and expanding combustion products are executed. At the last stage of the power stroke (and at the last stage of expansion process) the exhaust valve 1 (FIG. 1a) is opened—and engine cycle repeats.

Using the ports in the sleeve changes the optimal valve timing so that the optimal beginning of exhaust through the exhaust valve can become later (compared with the valve timing of a conventional engine) and can even shift to the beginning of the exhaust stroke.

Since the port 2 connects directly to the atmosphere, the movement of surrounding air can be used to improve the removal of combustion products from the port 2 and the supply air to the port 2. This refers to the movement of surrounding air created due to any of the reasons: wind, surrounding air movement relative to the machine (relative to a vehicle, for example the aircraft) as it moves, a propeller or a fan rotation, etc. Air flow (an air stream, air blast, current of atmospheric air, surrounding air) is directed to the port and the space around it (or the port and the space around it are opened to a stream of ambient air) so, that this air flow intensifies the removal of combustion products from the port and the replacement of the exhaust gases with fresh air.

In the simplest case, the engine is mounted so that the ambient air flow easily reaches the port in the sleeve (easily passes to the port in the sleeve) and blows the combustion products from the space around the port, preventing the return of the combustion products into the cylinder.

To intensify the supply of ambient air to the port an air channel can be used. Such the air channel 6 is shown in FIG. 2. The inlet 7 of the channel 6 is directed towards the incoming air flow, in other words, the direction of the axis of the inlet 7 to the channel is close to the velocity vector of the surrounding (incoming) air. Air inflow into the air channel 6 through inlet 7 is shown in FIG. 2a and FIG. 2b with white horizontal arrows. Such an air channel 6 is shown in FIG. 2. The inlet 7 to the channel 6 is directed towards the incoming air flow, in other words, the direction of the axis of the inlet 7 to the channel is close to the velocity vector of the surrounding (incoming) air. Air inflow into air channel 6 through inlet 7 is shown in FIG. 2a and FIG. 2b with white horizontal arrows. Air channel sections (sections perpendicular to the direction of air movement in it) may have a constant area or the air channel may narrow (the section area may decrease) in the direction of air movement.

The port 2 is cut in the cylinder sleeve along the cylinder directrix, which lies in a plane perpendicular to the axis of the cylinder. Therefore, to improve the removal of combustion products flowed out from the port 2, it is better to direct the flow of surrounding air so that it flows towards port 2 in the direction of the cylinder axis or at least at an acute angle to it. An acute angle is the smallest of the angles between the velocity vector of the air flow, flowing from the air channel 6, and the axis of the cylinder. The direction of the axis of the cylinder is selected based on the desired direction of removal of the products of combustion: "up", i.e. to the cylinder head, or "down"- to the crankcase. For the indicated air outlet (air flow from the channel) towards the port 2, the air channel 6 has a bend of the walls. Due to this bending, the air flow, that flows from the air channel 6 through the outlet 8 of this channel, flows (at least in the region of the port in the sleeve) in the direction of the cylinder axis or at an acute angle to this axis. The air flow from channel 6 is shown in FIG. 2a with white vertical arrows. It is clear that the air flowing out of the air channel 6 through its outlet 8 pushes off (blows out) the exhaust gases flowed out through the port 2, hence air occupies the space outside the port 2, that, according to the proposed method, prevents returning of the exhaust gases into the cylinder at the end of the intake and beginning of the compression.

Other versions of devices that facilitate the removal of exhaust gases from the port in the sleeve and the supply surrounding air towards the port (into the space outside the port and cylinder) are possible. For example, a device similar an ejector may be used. Versions of such a device are shown schematically in FIG. 3a and FIG. 3b.

The ejector usually has a pipe, which includes a confusor, a section of constant cross-sectional area and a diffuser. A similar pipe can be mounted on the port in the sleeve. More precisely, this is not a pipe, but a channel similar to the pipe. Such the channel 9 is shown in FIG. 3a and FIG. 3b. The cross-section (relative to the axis of the channel 9) of the channel (at least at the entrance of the channel) has a shape corresponding to the port 2. The exhaust gases exiting from the port 2 into the channel (into the channel entrance) are (act as) motive fluid. The channel 9 is mounted so that there is a passage (air gap) 10 between the channel entrance and the cylinder 4. The passage is used for the suction of surrounding air. This passage (air gap) 10 is the suction channel for the suction fluid and is similar to the input for the suction fluid in the ejector. In this case, suction fluid is the surrounding air.

Exhaust gases that flow out through the port 2 flow into channel 9. Due to the high velocity of the gases flowing out of the cylinder, according to Bernoulli's law, the gas pressure drops, and atmospheric air passes through suction passage (air gap) 10 to port 2. Air movement in passage 10 is shown by a white arrow. This additionally facilitates the removal of combustion products from the cylinder and the air supply to the port 2.

A nozzle 11 can be mounted on the port in the sleeve (see FIG. 3b). This nozzle directs the exhaust gases to the atmosphere or channel. FIG. 3b shows a version of the device with a short nozzle directing exhaust gases (flowing through the port 2) into the channel 9. But, in a version of embodiment, nozzle 2 can be used independently, without channel 9.

In an embodiment, a deflector may be used instead of the channel 9. As a deflector, for example, an inclined plate or an upper part of the channel 9 can be used. Such deflector isolates parts, systems and wires of the engine from hot exhaust gases and facilitates the supply of fresh air to the port.

In a version of proposed method gas-dynamic (wave) processes are used in the channel 9, which is mounted on the port in the sleeve. As in the previous embodiments (shown in FIG. 3a or FIG. 3b), the exhaust gases exiting the port are supplied to the channel 9 (enter into the channel 9) which is mounted so that there is the passage (gap) 10 between the inlet of the channel and the cylinder 4. This passage 10 is designed for suction of air from the atmosphere. In this embodiment, the channel 9 may have both a cross-sectional area variable in length (confusor, diffuser) and a constant cross-sectional area. In this embodiment, the length of the channel 9 is of great importance, which (length) is determined (calculated) based on the following. After the port in the sleeve is opened, a portion of exhaust gases enters the channel and creates a compression wave in the channel. This wave, while exiting through the open end of the channel, creates a rarefaction wave. With a certain length of the channel, the rarefaction wave comes to the port in the sleeve, where it helps to remove exhaust gases from the port and the supply surrounding air to the port in the time interval between closing the port in the sleeve at the exhaust stroke and opening the port at the end of the intake stroke. Said channel length is determined for crankshaft speed, which is most important for engine operation.

Another version of devices that facilitate the removal of exhaust gases from the port in the sleeve and the supply of surrounding air to the port (to the space outside the port and cylinder) is shown in FIG. 4. The basis of this version of the device is a turbomachine 12 mounted on the port 2 (near the port 2).

At the end of the power stroke (see FIG. 4a) the port 2 in the sleeve is opened as piston 3 is at BDC (BDC of the power stroke) and exhaust gases flow out of the cylinder 4 through the port 2. The outflow of exhaust gases through the port is shown in FIG. 4a with a black arrow. The exhaust gases rotate the turbomachine 12. The blades (vanes) of the latter remove (discard) the exhaust gases from the port and the supply fresh surrounding air toward the port (to the space outside the port and cylinder).

During the period when the port 2 is opened at the end of the power stroke and at the beginning of the exhaust stroke, turbomachine 12 is gaining (increasing) speed. Then, in the period between the closing of the port 2 at the beginning of the exhaust stroke and the subsequent opening of the port 2 at the end of the intake stroke, when the port is closed, the turbomachine 12 rotates by inertia. During this period (the beginning of the exhaust stroke—the end of the intake stroke, the port is closed), the blades of the turbomachine 12 capture fresh air and drive (pump) it to the port.

In this way, the removal of the exhaust gases from the port in the sleeve and the supply of surrounding air toward the port (outside the port and cylinder) are executed—see FIG. 4a. The rational speed (frequency of rotation) of turbomachine 12 is achieved by choice a moment of inertia of turbomachine 12 (by implementation turbomachine 12 with the desired moment of inertia).

Fresh air may also be supplied through the hollow axis of the turbomachine 12. For this purpose, slots are cut in hollow axis between blades. The air enters through the ends of the hollow axis and exits through the slots into the space between the blades and, further, is ejected by centrifugal force to the port 2.

As seen in FIG. 4b, in plan view (top view), the outer edge of the blades of the turbomachine 12 has a circumferential shape coaxial to the cylinder. This contributes to a better removal of combustion products from the port 2.

Depending on the engine and its operation mode, two versions of the operation of the turbomachine 12 are rational. In the first embodiment, the main one is the air supply to the port 2, including the creation of excess pressure outside the port 2, in order to supply air to the cylinder at the end of the inlet and the beginning of the compression. In the second version, the goal is scavenging (this version, we will call "scavenging version"), for which a depression is created at the end of the intake and the beginning of compression outside the port 2. To implement the second version, the turbomachine 12 is isolated (e.g., by a casing) from the fresh air supply. In the two versions, the geometry of the turbomachine 12 is different (different bending of the blades, etc.).

Said "scavenging version," in which air flow out of the cylinder (scavenging) through the port in the cylinder sleeve at the end of the intake stroke and/or at the beginning of the compression stroke, in principle, can be executed with other versions of the implementation of the proposed method considered above.

The flow of gases, corresponding to the scavenging version, can be executed when the inertia of the gases flowing through port 2 is high, then air (fresh charge) flows out of the cylinder following them. (That is, the cylinder scavenging is executed.) The scavenging version is also executed when air is supplied into the cylinder under pressure above atmospheric pressure. The pressure increasing is executed in various methods: supercharging (here supercharger is a mechanical driven compressor), inertial supercharging, for example, due to wave processes in the intake manifold, dynamic velocity pressure due to vehicle movement (ram air intake), the use of a wave pressure exchanger, turbocharging, etc. Among the methods of increasing pressure is the following: air is supplied to the cylinder of a four-stroke engine from its crankcase.

CONCLUSION

The idea of the simplest version of the proposed method can be formulated as follows. To cut (to make) the port in the sleeve and not to interfere with the exhaust gases flowed out through this port fly away from the cylinder. In such a case, at the end of the intake, the exhaust gases do not return to the cylinder through the port, despite the fact, that the port at the end of the intake is open.

The proposed method can only be used in engines the proportion of which of the total number of engines is completely negligible. These are only four-stroke engines, and among them only engines that have no restrictions on the toxicity of exhaust gases, for example, engines for small models of aircraft. And among these engines are only those in which hot exhaust gases from the port in the sleeve do not harm the engine equipment and the machine (aircraft) on which the engine is installed.

What is claimed is:

1. A method of gas exchange of an aircraft four-stroke engine, which has a port in a cylinder sleeve, said port being opened when a piston is near BDC, an engine cycle of the said engine including intaking a fresh charge, compressing the fresh charge in a cylinder, combustion, expansion processes on the power stroke, exhausting combustion products, including exhausting combustion products through the port at the end of the power stroke and at the beginning of the exhaust stroke, wherein a) with the goal of not interfering with the exhaust gases being exhausting through the port so as to allow them to fly away from the cylinder, a combustion chamber connects directly with the atmosphere via the port with the result of combustion products exhausting from the cylinder through the port directly into the atmosphere and being removed from the port due to the inertial movement of gases flowing out of the cylinder through the port, while said direct connection to the atmosphere means a connection without the use of exhaust devices attached to the port, said exhaust devices mean devices are selected from the group consisting of an exhaust manifold, exhaust pipe, and muffler, b) with the goal of intensifying both the removal of exhaust gases from the port and supplying fresh atmospheric air to the port, the engine is installed in such a way that a stream of the atmospheric air is directed toward the port and into space around it, said air stream being created by a movement of the aircraft, on which the engine is installed, or by a fan or a propeller, or wind, or some combination of the above, as a result of which exhaust gases are removed from the port directly into the atmosphere and the exhaust gases are replaced with fresh air in the space around the port.

2. The method according to claim 1, wherein air intake into the cylinder takes place through the port in the cylinder sleeve at the end of the intake stroke or at the end of the intake stroke and at the beginning of the compression stroke.

3. A method of gas exchange of an aircraft four-stroke engine, which has a port in a cylinder sleeve, said port being opened when a piston is near BDC, an engine cycle of the said engine including intaking a fresh charge, compressing the fresh charge in a cylinder, combustion, expansion processes on the power stroke, exhausting combustion products including exhausting combustion products through the port into a channel at the end of the power stroke and at the beginning of the exhaust stroke, wherein said channel or a deflector is mounted on the port so that there is a clearance or a passage between an entrance of the channel or the deflector and the cylinder, atmospheric air is sucked in or/and supplied through said clearance or the passage to the port, into a space close to the port, the specified suction and/or air supply occurs due to an outflow and removal of exhaust gases from the port into the channel or to the deflector.

4. The method according to claim 1 or 2 or 3, wherein an air channel or a convergent channel, or an air deflector is used to intensify the stream of atmospheric air towards the port, while an entrance to the air channel or to the convergent channel or to the air deflector is directed towards an incoming stream of the atmospheric air, and an outlet of the air channel, or the convergent channel, or the air deflector is directed towards the port.

5. The method according to claim 4, wherein the air channel or the convergent channel is bent, or the air deflector is bent so that the air, flowing out of the air channel or the convergent channel or of the air deflector, flows in the direction of a cylinder axis or at an acute angle to the cylinder axis.

6. The method according to claim 3, wherein the exhaust gases flowing out through the port in the cylinder sleeve, are directed from the cylinder into the atmosphere or channel by means of a short nozzle that is mounted outside the port.

7. A method of gas exchange of an aircraft four-stroke engine, which has a port in a cylinder sleeve, said port being opened when a piston is near BDC, an engine cycle of the said engine including intaking a fresh charge, compressing the fresh charge in a cylinder, combustion, expansion processes on the power stroke, exhausting combustion products including exhausting combustion products through the port at the end of the power stroke and at the beginning of the exhaust stroke, wherein a turbomachine mounted on the port or near the port, the exhaust gases rotate the turbomachine, blades of the latter remove the exhaust gases from the port and supply fresh atmospheric air toward the port, to a space close the port.

8. The method according to claim 7, wherein fresh air is supplied toward the port through a hollow axis of the turbomachine, the air enters through the ends of the hollow axis and exits through the slots into a space between the blades.

9. The method according to claim 7 or 8, wherein, an outer edge of the blades of the turbomachine in a plan view has a circumferential shape coaxial to the cylinder.

10. The method according to claim 3, wherein air intake into the cylinder takes place through the port in the cylinder sleeve at the end of the intake stroke or at the end of the intake stroke and at the beginning of the compression stroke.

\* \* \* \* \*